United States Patent
Kim et al.

(10) Patent No.: US 9,005,093 B2
(45) Date of Patent: Apr. 14, 2015

(54) ROLLER FOR IMAGING APPARATUS AND IMAGING APPARATUS INCLUDING THE ROLLER

(75) Inventors: Soon-nam Kim, Suwon-si (KR); Hee-won Jung, Suwon-si (KR); Moon-young Kim, Seoul (KR); Dong-jin Park, Anyang-si (KR); Myoung-su Baek, Suwon-si (KR); Yong-hoon Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 13/367,796

(22) Filed: Feb. 7, 2012

(65) Prior Publication Data

US 2012/0201572 A1    Aug. 9, 2012

(30) Foreign Application Priority Data

Feb. 9, 2011    (KR) ................. 10-2011-0011622

(51) Int. Cl.
| | |
|---|---|
| F16C 13/00 | (2006.01) |
| G03G 15/02 | (2006.01) |
| B29C 67/24 | (2006.01) |
| B29C 70/52 | (2006.01) |
| G03G 15/08 | (2006.01) |

(52) U.S. Cl.
CPC ............ *G03G 15/0233* (2013.01); *B29C 67/24* (2013.01); *B29C 70/521* (2013.01); *F16C 13/00* (2013.01); *G03G 15/0808* (2013.01); *G03G 15/0818* (2013.01)

(58) Field of Classification Search
USPC ................................. 492/50, 53, 49
See application file for complete search history.

(56) References Cited

U.S. PATENT DOCUMENTS

| | | | | |
|---|---|---|---|---|
| 6,340,528 | B1 * | 1/2002 | Hsieh et al. ............... | 428/412 |
| 2003/0131743 | A1 * | 7/2003 | Sauer et al. .............. | 101/348 |
| 2006/0177244 | A1 | 8/2006 | Hasegawa et al. | |

FOREIGN PATENT DOCUMENTS

| | | |
|---|---|---|
| JP | 62-227952 | 10/1987 |
| JP | 2003-195601 | 7/2003 |
| JP | 2004-150610 | 5/2004 |
| JP | 2006-023703 | 1/2006 |
| JP | 2006-206672 | 8/2006 |
| JP | 2007-148299 | 6/2007 |
| JP | 2007-333923 | 12/2007 |

* cited by examiner

*Primary Examiner* — Christopher Besler
(74) *Attorney, Agent, or Firm* — Staas & Halsey LLP

(57) ABSTRACT

A roller includes a shaft including reinforcing fiber and a binder resin; and an elastic body surrounding an outer surface of the shaft, wherein an average length to average diameter ratio (L/D) of the reinforcing fiber is from about 15,000:1 to about 50,000:1.

11 Claims, 3 Drawing Sheets

ROLLER FOR IMAGING APPARATUS AND IMAGING APPARATUS INCLUDING THE ROLLER

CROSS-REFERENCE TO RELATED APPLICATIONS

This application claims the benefit of Korean Patent Application No. 10-2011-0011622, filed on Feb. 9, 2011, in the Korean Intellectual Property Office, the disclosure of which is incorporated herein in its entirety by reference.

BACKGROUND

1. Field

The present disclosure relates to a roller for an imaging apparatus, and an imaging apparatus including the roller.

2. Description of the Related Art

According to a charging mechanism of a general electrophotographic imaging apparatus, as illustrated in FIG. 1, after being charged by a charging roller 16, an image carrier 11 is exposed to light from a laser scanning unit (LSU) 18 so that a latent image is formed on the image carrier 11. Toner 14 is supplied to a developing roller 12 by a toner supplying roller 13. The toner 14 supplied on the developing roller 12 is made to be a uniform thin layer by a toner layer-regulating device 15 and at the same time is frictional-charged. The toner 14 regulated by the toner layer-regulating device 15 develops the electrostatic latent image on the image carrier 11 into a toner image, which is then transferred to paper by a transfer roller 19 and fixed by a fixing device (not shown). A cleaning blade 17 is used to remove the toner remaining on the image carrier 11 after the transfer.

As described above, imaging apparatuses employ functional rollers, such as, for example, a charging roller, a developing roller, a toner supply roller, and a transfer roller. These functional rollers are conventionally in the shape of shafts, and are made of metal. For example, SUM 22, SUS 416, and the like are widely used to manufacture the functional rollers. A pseudo-conductive rubber or foam part is fit to a metallic shaft with an adhesive applied around the metallic shaft. Vulcanization may be performed if necessary. The vulcanization process is typically performed at around 180° C., and thus materials with good heat resistance are suitable. For a polishing process to obtain a desired outer diameter, materials with high flexural strength are generally suitable. Therefore, resin alternatives to such metal materials need to have high conductivity, heat resistance, and mechanical strength. A metallic shaft (such as a Core Bar) is very expensive, and very heavy due to a large specific gravity. Furthermore, the more complicated the structure of its opposite ends, the much higher the cost of machining through cutting becomes. In general, metallic shafts are made of free-cutting steel plated with nickel (Ni) or zinc (An). However, when exposed to humid conditions for a long time, free-cutting steel becomes easily rusted. Thus, the free-cutting steel is often replaced with much more expensive materials such as stainless steel to avoid this problem.

SUMMARY

Additional aspects and/or advantages will be set forth in part in the description which follows and, in part, will be apparent from the description, or may be learned by practice of the invention.

According to an aspect of the present disclosure, there is provided a roller of an imaging apparatus, the roller including: a shaft including reinforcing fiber and a binder resin; and an elastic body surrounding an outer surface of the shaft, wherein an average length to average diameter ratio (L/D) of the reinforcing fiber is from about 15,000:1 to about 50,000:1.

The reinforcing fiber may include at least one selected from the group consisting of glass fiber, carbon fiber, aromatic polyamide fiber, whole aromatic polyester fiber, superstrength polyethylene fiber, polybenzoxazole fiber, polybenzthiazole fiber, polyimide fiber, polybenzimidazole fiber, polyphenylene sulfide fiber, silicon carbide fiber, boron fiber, alumina fiber, and metal fiber.

The reinforcing fiber may have an average length of from about 100 mm to about 500 mm.

The shaft may have a multi-layer structure including an inner layer and an outer layer surrounding an outer surface of the inner layer.

An inner-layer diameter to outer-layer diameter ratio of the shaft may be 0.85 or less.

The inner layer may include glass fiber, and the outer layer may include carbon fiber.

The binder resin may include at least one selected from the group consisting of polyester resin, vinyl ester resin, epoxy resin, phenol resin, and polyimide resin.

The shaft may include about 40 parts to about 250 parts by weight of the reinforcing fiber with respect to 100 parts by weight of the binder resin.

The elastic body may include at least one selected from the group consisting of urethane rubber, acrylonitrile rubber, epichlorohydrin rubber, acrylonitrile butadiene rubber, nitrile butadiene rubber, acrylonitrile butadiene isoprene rubber, silicon rubber, ethylene propylene rubber, ethylene propylene diene rubber, styrene butadiene rubber, polyolefin-based resin, fluorine-based resin, urethane foam, and silicon foam.

The roller may be a developing roller, a supplying roller, a cleaning roller, a charging roller, or a transfer roller of the imaging apparatus.

According to another aspect of the present disclosure, there is provided a method of manufacturing a roller of an imaging apparatus, the method including: supplying at least one kind of reinforcing fiber in the form of continuous strands to an impregnation bath containing a molten binder resin; manufacturing a shaft by pulling the at least one kind of reinforcing fiber in the form of continuous strands impregnated with the molten binder resin; and coating an outer surface of the shaft with an elastic body.

According to another aspect of the present disclosure, there is provided an imaging apparatus including: an image carrier on which an electrostatic latent image is formed; a developing roller supplying toner to the image carrier; a supplying roller supplying toner to the developing roller; and a charging roller charging the image carrier, wherein at least one of the developing roller, the supplying roller, and the charging roller includes the above-described roller.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

The present disclosure will now be described more fully with reference to the accompanying drawings, in which exemplary embodiments of the present disclosure are shown.

According to an embodiment of the present disclosure, a roller for an imaging apparatus is manufactured using a reinforcing fiber with good conductivity, heat resistance and mechanical characteristics, light weight, and good resistance to corrosion, oil and chemicals, wherein the length of the reinforcing fiber is adjusted to be same as that of a shaft. Thus, the roller with higher flexural strength, relative to general shafts, is obtained at lower costs.

Figure 2:
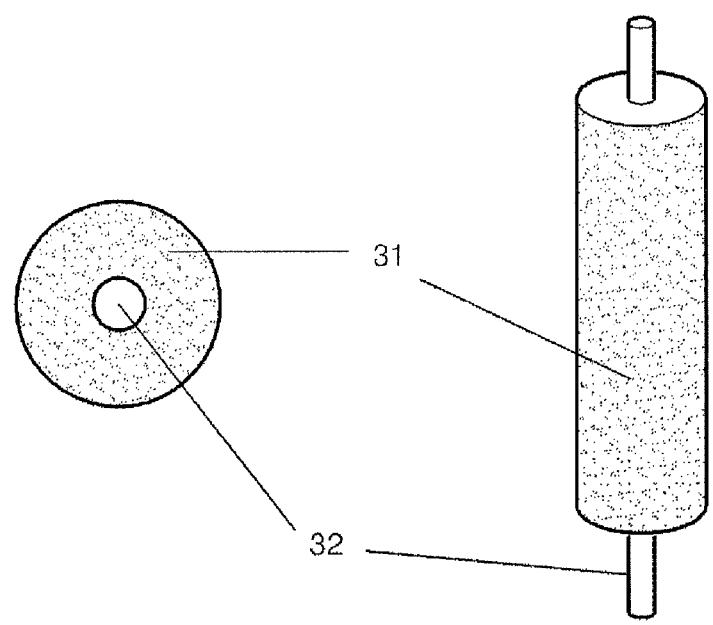
FIG. 2 illustrates a roller of an imaging apparatus, according to an embodiment.

FIG. 2 illustrates a roller of an imaging apparatus according to an embodiment. Referring to FIG. 2, the roller includes a shaft 32 containing reinforcing fibers (not shown) and a binder resin (not shown), and an elastic body 31 surrounding the shaft 32.

The reinforcing fiber may be in the form of a bundle of filaments or a yarn of twisted filaments. The reinforcing fiber contributes to the strength of a shaft in the center of the roller for an imaging apparatus. The binder resin is impregnated among the reinforcing fibers and cured to strongly bind the reinforcing fibers.

Any reinforcing fiber that provides rigidity, tensile strength, and heat resistance to the shaft, thereby ensuring stable operation of the roller for a long term, may be used. Examples of the reinforcing fiber include, but are not limited to, at least one selected from the group consisting of glass fiber, carbon fiber, aromatic polyamide fiber, whole aromatic polyester fiber, super-strength polyethylene fiber, polybenzoxazole fiber, polybenzthiazole fiber, polyimide fiber, polybenzimidazole fiber, polyphenylene sulfide fiber, silicon carbide fiber, boron fiber, alumina fiber, and metal fiber, such as, stainless steel, copper, brass, and the like.

Non-limiting examples of the carbon fiber include polyacrylonitrile (PAN)-based carbon fibers obtained by carbonizing PAN, and pitch-based carbon fibers. Carbon fibers have high conductivity, and have high flexural strength when molded into products, thus, satisfying the requirement of high flexural strength and conductivity for the roller of an imaging apparatus to properly operate.

Glass fibers are widely used as a material for reinforcing resin. Due to the glass fibers being able to strongly bind with binder resin, they may provide the shaft with good surface characteristics. The glass fibers are very cheap, and thus, suitable to use as a material for the non-conductive shaft of the roller. The glass fibers may provide high enough strength for the shaft to properly operate, despite having relatively weak flexural strength by themselves, as long as the shaft is manufactured to have a great outer diameter that is sufficient to endure bending.

While general resin-based shafts are manufactured by adding short fibers of tens of micrometers to a main component binder resin and using injection molding, the shaft of the roller of an imaging apparatus, according to embodiments of the present disclosure, is manufactured by passing the reinforcing fiber in the form of a bundle or yarn through a soaking bath containing binder resin and using pultrusion. The reinforcing fiber may be prepared to have a length corresponding to that of the shaft. For example, the reinforcing fiber may have a length of from about 100 mm to about 500 mm.

An average length to average diameter ratio (L/D) of the reinforcing fiber may be, for example, from about 15,000:1 to about 50,000:1, or from about 20,000:1 to about 45,000:1.

Manufacturing of the roller of an imaging apparatus involves polishing the elastic body which surrounds the shaft. The elastic body is an insulating or pseudo-conductive body formed of a material such as rubber or foam. For general resin-based shafts, an excessive bending phenomenon occurs during the polishing process, thus, the elastic body deforms into an inverse crown shape.

However, when the average length to average diameter ratio (L/D) of the reinforcing fiber is within the above ranges, the reinforcing fiber is long enough to correspond to the entire length of the shaft, and thus may enhance the flexural strength of the shaft at low material costs, solving the low flexural strength problem with the general shaft containing short reinforcing fibers.

The binder resin may be any resin that can be cured after being impregnated among the bundles or yarns of reinforcing fibers in order to strongly bind the reinforcing fibers, which are the main reinforcing component as described above. For example, thermosetting resins that do not soften once being cured (for example, by heat), and have resistance to heat, solvents and chemicals and good mechanical and electric insulating characteristics may be used. For example, thermoplastic resins may also be used. Examples of the binder resin include, but are not limited to, at least one selected from the group consisting of polyester resins, vinyl ester resins, epoxy resins, phenol resins, and polyimide resins. The vinyl ester resins, which are a kind of thermosetting resin, may be obtained by reacting epoxy resins with acrylic acids and dissolving the reaction product in styrene. The vinyl ester resins have strong resistance to corrosion, strong mechanical strength, and high elongation.

The amount of the reinforcing fiber in the shaft may be, for example, from about 40 parts to about 250 parts by weight, or from about 60 parts to about 230 parts by weight, based on 100 parts by weight of the binder resin.

When the amount of the reinforcing fiber is within these ranges, a molding process in the manufacture of the shaft may be facilitated, and the manufactured roller may have strong tensile and flexural strengths and may be durable enough to work for a long period of time.

In addition to the reinforcing fiber and the binder resin, the shaft may further include various resin additives, for example, a releasing agent, a curing agent, a lubricant, and the like, as long as they do not interfere with the objective of the present invention.

In some embodiments, the elastic body, which has a tubular form, surrounding the shaft, may be, for example, foamed or unfoamed rubber. For example, the rubber may be any rubber having a cross-linking system, such as, a sulfur-based cross-linking system, or a blend thereof. For example, the elastic body may include at least one selected from the group consisting of urethane rubber, acrylonitrile rubber, epichlorohydrin rubber, acrylonitrile butadiene rubber, nitrile butadiene rubber, acrylonitrile butadiene isoprene rubber, silicon rubber, ethylene propylene rubber, ethylene propylene diene rubber, styrene butadiene rubber, polyolefin-based resins (for example, PE, PP, PS, PVC, and the like), fluorine-based polymer resins (for example, PTFE, ETFE, PFA, PEP, PVF, FPE, and the like, and mixtures thereof).

The acrylonitrile butadiene rubber is a copolymer obtained by low-temperature emulsion polymerization of acrylonitrile and butadiene, and has strong resistance to oil and chemicals. The greater the acrylonitrile content, the stronger the resin-based characteristics, such as anti-abrasive property, tensile strength, and chemical resistance, become, and on the other hand, the less the repelling elasticity, permanent compressive shrinkage, cold resistance, and elongation. For example, the acrylonitrile content may be, but is not limited to, from about 10 mole % to about 35 mole %. If the acrylonitrile content exceeds about 30 mole %, the acrylonitrile butadiene rubber may be more vulnerable to environmental conditions. If the acrylonitrile content is less than about 10 mole %, the acrylonitrile butadiene rubber may have increased electric resistance.

The epichlorohydrin rubber may be, for example, an ethyleneoxide-allyl glycidyl ether-epichlorohydrin terpolymer or an ethyleneoxide-epichlorohydrin copolymer. If the copolymerization ratio of the ethyleneoxide is less than 36 mole %, the electric resistance of a conductive roller, such as a charging roller or a developing roller, may be insufficient. Accordingly, the copolymerization ratio of the ethyleneoxide in the epichlorohydrin rubber may be from about 38 mole % to about 58 mole %. The epichlorohydrin rubber may be used alone or in blended with other base rubber. About 5 parts to about 100 parts by weight of the epichlorohydrin rubber may be used based on 100 parts by weight of the other base resin, in terms of extrusion characteristics and costs.

Figure 3:
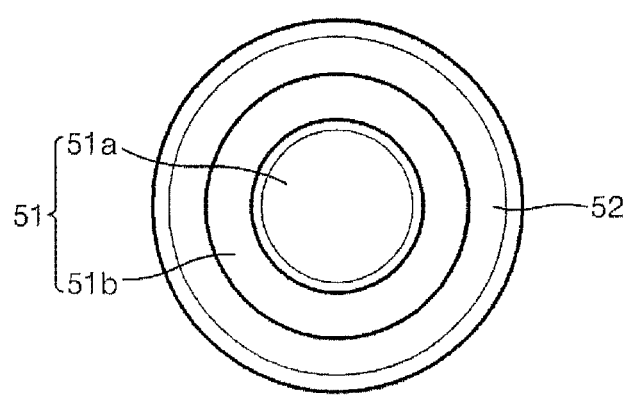
FIG. 3 is a cross-sectional view of a roller of an imaging apparatus, according to another embodiment.

In another embodiment of the roller of an imaging apparatus, the shaft may also include multi-layers of reinforcing fibers, instead of the single-layer of reinforcing fibers described in the previous embodiments. FIG. 3 is a cross-sectional view of a roller of an imaging apparatus according to another embodiment of the present disclosure. Referring to FIG. 3, the roller having a multi-layered structure may include a shaft 51 that includes an inner layer 51a and an outer layer 51b surrounding the inner layer 51a, and an elastic body 52 surrounding the shaft 51. In the multi-layered structure, the inner layer 51a may include reinforcing fiber that costs less and does not damage the rigidity, tensile strength or heat resistance of the roller, while the outer layer 51b may include reinforcing fiber that may be more costly, but has better mechanical characteristics, for example, stronger rigidity, than that of the inner layer 51a. For a roller that needs a charging ability, conductive reinforcing fiber may be used to surround the inner layer for cost effectiveness.

An inner-layer diameter to outer-layer diameter ratio of the shaft 51 may be about 0.85 or less, and in some embodiments, may be from about 0.01 to about 0.85, and in some other embodiments, may be from about 0.05 to about 0.8. When the inner-layer diameter to outer-layer diameter ratio of the shaft 51 is within these ranges, the overall mechanical strength of the shaft 51 may be improved even with mechanically weak fibers, which are not ordinarily strong enough to form a single-layered shaft, used in the inner layer 51a of the multi-layered structure.

In one embodiment, the inner layer 51a of the shaft 51 may include glass fiber, while the outer layer 51b may include carbon fiber. A larger amount of the glass fiber may be used in the inner layer 51a than the amount of the carbon fiber in the outer layer 51b to maintain the overall rigidity of the shaft 51. The carbon fiber in the outer layer 51b enables manufacture of a roller with charging ability without an addition of a conducting agent.

According to another embodiment of the present disclosure, a method of manufacturing a roller of an imaging apparatus may include: supplying at least one kind of reinforcing fiber in the form of continuous strands to an impregnation bath containing a molten binder resin; manufacturing a shaft by pulling the at least one kind of reinforcing fiber in the form of continuous strands impregnated with the molten binder resin; and coating an outer surface of the shaft with an elastic body.

The method of manufacturing the roller of an imaging apparatus will be described in detail below.

Molten binder resin, and other additives, for example, a releasing agent, a hardening agent, and the like, are thoroughly mixed in a stirrer and injected into an impregnation bath. Reinforcing fiber in the form of a bundle or yarn of continuous strands wound around a cylindrical bar is passed through the impregnation bath to be impregnated with the binder resin, and then molded in a molder using pultrusion to manufacture a preliminary shaft. For a shaft with a multi-layered structure, two kinds of reinforcing fiber of continuous strands are separately passed through the impregnation bath, and collected together in the form of an inner layer and an outer layer before an inlet of the molder, and molded using pultrusion.

The pultrusion speed in the molder may be from about 5 cm/min to about 200 cm/min, the molding time for which the impregnated reinforcing fiber is held may be from about 1 minute to about 4 minutes, and the temperature of the molder may be from about 140° C. to about 160° C. The preliminary shaft may have a cross-sectional shape, for example, a circular, rectangular, or triangular cross-sectional shape, depending on a shape of a die of the molder.

A surface of the preliminary shaft is polished using a centerless polishing machine to obtain a desired external diameter, followed by machining with an exclusive processing machine for step-cut and D-cut, thereby obtaining a final shaft.

Then, an outer surface of the shaft is coated with the elastic body, and thus a roller for an imaging apparatus is obtained. The coating may be performed using various known methods. For example, while the shaft may be previously placed in the molder, an elastic material, for example, a urethane molding material, may be cast around the shaft and solidified. Another method may involve molding a tube using an elastic material and inserting by pressure the shaft into the elastic tube. Another method may involve applying an adhesive and attaching an elastic material sheet to the outer surface of the shaft at a high temperature of about 100° C. to about 120° C. Before or after being used to coat the shaft, the elastic body of rubber may be vulcanized if necessary.

When manufacturing a shaft by pultrusion of the reinforcing fiber impregnated with the binder resin, a length of the reinforcing fiber may be adjusted to be equal to the length of the shaft. In this case, the reinforcing fiber, by supporting the entire shaft, may markedly improve the flexural strength of the roller. On the other hand, when manufacturing a conventional resin shaft using common injection molding, only a reinforcing material having a short length of several millimeters is added in order for the molder to smoothly operate. However, such a conventional resin shaft may suffer from reduced flexural strength during a polishing process after being coated with the elastic body.

In the roller for an imaging apparatus according to the embodiments described above, the shaft is manufactured using the reinforcing fiber and the binder resin, instead of using metal. Thus, material and process costs are lowered, distribution costs are lower, and handling is simplified, due to the light material weight. The shaft also has improved resistance to corrosion, chemicals and oil.

A general metal shaft is mostly made of free-cutting steel with nickel (Ni) or zinc (Zn) plated, or by using costly stainless steel. Thus, material costs of the general metal shaft are high. For a metal shaft, the machining costs for step-cut of its both ends and D-cut for a driving gear assembly are also very high. The more complicated the structure of the metal shaft, the higher the machining costs may become. However, according to an embodiment of the present disclosure, the shaft may be formed of the reinforcing fiber and binder resin, and optionally an additive, for example, a hardening agent, a releasing agent, or the like, and thus its material costs are low. The costs of cutting, step-cut, and D-cut machining for the resin shaft molded in the form of a circular rod are very low relative to those required to process general metal shafts. According to another embodiment, the shaft may be manufactured at further lower costs by forming inner and outer layers in a manner where a larger amount of glass fiber, which is relatively cheap compared to carbon fiber, is used in the inner layer, and a smaller amount of carbon fiber than that of the glass fiber is used in the outer layer.

According to an embodiment of the present disclosure, the shaft weighs about one-fifth of a general metal shaft and is easy to handle, leading to lowered distribution costs. Functional rollers, which are mostly transported by automobile, train, ship, and the like, are frequently dropped or vibrate due to impacts, which is much more serious when they are heavier, causing leakage of a large amount of toner. However, these problems may be prevented by using the light-weight shaft according to the embodiments of the present disclosure. Materials for general metal shafts are easily corroded in wet conditions. Even free-cutting steel plated with nickel (Ni) or zinc (Zn) may corrode when left in a humid warehouse for a long time, thus negatively affecting product performance and image quality. Furthermore, the free-cutting steel plated with Ni or Zn has weak adhesion to elastic materials by nature, and rather may be separated from the elastic material by air foam, which lowers production yields. However, according to an embodiment, the shaft including the reinforcing fiber and binder resin is highly compatible with elastic materials, having strong adhesion. Further, due to the light-weight shaft, a driving system may be light-weight, thus consuming less power.

The roller for an imaging apparatus according to the present disclosure may be used as a developing roller, a supplying roller, a cleaning roller, a charging roller, a transfer roller, or the like in various imaging apparatuses, such as printers, facsimiles, copy machines, and the like.

According to an embodiment, an imaging apparatus includes: an image carrier on which an electrostatic latent image is formed; a developing roller supplying toner to the image carrier; a supplying roller supplying toner to the developing roller; and a charging roller charging the image carrier, wherein at least one of the developing roller, the supplying roller, and the charging roller is the roller described in the previous embodiments.

Figure 1:
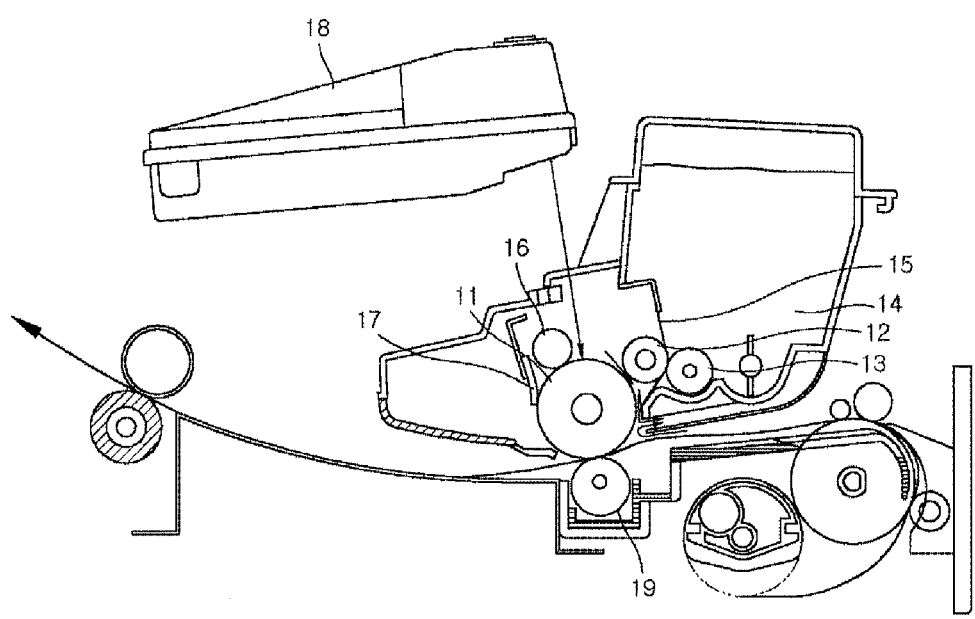
FIG. 1 illustrates an example of a general electrophotographic imaging apparatus.

As illustrated in FIG. 1, an imaging apparatus according to an embodiment may include an image carrier 11, a developing roller 12, a toner supplying roller 13, toner 14, a toner-layer regulating device 15, a charging device 16, a cleaning blade 17, a laser scanning unit (LSU) 18, and a transfer roller 19, wherein one of the developing roller 12 and the charging device 16 includes the shaft 31 and the elastic body 32 illustrated in FIG. 2. In a charging mechanism of the image forming apparatus according to an embodiment, after being charged by the charging device 16, the image carrier 11 is exposed to the LSU 18 so that a latent image is present on the image carrier 11. Toner 14 is supplied to the developing roller 12 by the toner supplying roller 13. The toner 14 supplied on the developing roller 12 is made thin to form a uniform layer by the toner layer-regulating device 15, and at the same time is frictional-charged high. The toner 14 passed through the toner layer-regulating device 15, develops the electrostatic latent image on the image carrier 11 into a toner image, which is then transferred to paper by the transfer roller 19 and fixed by a fixing device (not shown). The toner remaining on the image carrier 11 after the transfer to the paper is removed by the cleaning blade 17.

An electrophotographic imaging apparatus may include the roller according to an embodiment of the present disclosure for a developing roller. Examples of the electrophotographic imaging apparatus include common electrophotographic imaging apparatuses, including a laser printer, a LED-head printer, a facsimile, a copy machine, and a multi-functional peripheral apparatuses.

The disclosed embodiments will be described in further detail with reference to the following examples. The following examples are for illustrative purposes only and are not intended to limit the scope of the invention.

Example 1

100 parts by weight of vinyl ester-based binder resin (SAMHWA PAINT IND. CO,. LTD/POLIMASTER HT-340), 3 parts by weight of fatty acid-added ester-based releasing agent (Technik Product Inc./TECH LUBE KP-175), and 5 parts by weight of peroxyester-based hardening agent (Seki Arkema/Luperox TBEC) were thoroughly mixed in a stirrer and put in an impregnation bath for pultrusion. Polyacrylonitrile (PAN)-based carbon fiber (12K, Toray Co., Japan) having a diameter of 7 μm was passed through the impregnation bath and molded using a circular mold to obtain a preliminary shaft having an outer diameter of about 5.2 mm and a length of about 257 mm. The pultrusion speed was 40 cm/min, the time for which the impregnated carbon fiber was retained and cured in the mold was 2.5 minutes, and the mold temperature was 160° C.

The preliminary shaft was processed using a centerless polishing machine to an external diameter of 5 mm, followed by step-cut and D-cut machining, to manufacture a final shaft. A length of the carbon fiber in the final shaft was 257 mm corresponding to the length of the shaft.

An outer surface of the shaft was coated with an ethylvinylacetate (EVA)-based hot melt (Samsung gratech co./HCF 600), and an elastic body of polyurethane foam (MF-80 Foam, available from INOAC, Co., Japan) was attached at a high temperature of 110° C. to manufacture a supplying roller having an outer diameter of 12.4 mm.

Example 2

A supplying roller was manufactured in the same manner as in Example 1, except that a polyester-based binder resin (SAMHWA PAINT IND. CO,. LTD/POLIMASTER HT-320) was used.

Example 3

A supplying roller was manufactured in the same manner as in Example 1, except that an epoxy-based binder resin (JEILCHEMICAL CO, Ltd./JT-205A) was used.

Example 4

100 parts by weight of vinyl ester-based binder resin (SAMHWA PAINT IND. CO,. LTD/POLIMASTER HT-340), 3 parts by weight of fatty acid-added ester-based releasing agent (Technik Product Inc./TECH LUBE KP-175), and 5 parts by weight of peroxyester-based hardening agent (SEKI ARKEMA/Luperox TBEC) were thoroughly mixed in a stirrer and put in an impregnation bath for pultrusion. Glass fibers (2200TEX, available from KCC Co., Ltd, Korea) having a diameter of 7 μm, and polyacrylonitrile (PAN)-based carbon fibers (12K, Toray Co., Japan) having a diameter of 7 μm were passed through the impregnation bath and molded using a circular mold in manner where the glass fibers were arranged to form a core and the carbon fibers were arranged to surround the glass fibers, thus obtaining a preliminary shaft. The preliminary shaft had a multi-layer structure including an inner layer comprising the glass fiber and an outer layer comprising the carbon fiber. An outer diameter of the inner layer was 3 mm, and an outer diameter of the outer layer was 5.2 mm. A length of the preliminary shaft was 257 mm. The pultrusion speed was 40 cm/min, the molding time for which the impregnated fiber was retained and cured in the mold was 2.5 minutes, and the mold temperature was 160° C.

The preliminary shaft was processed using a centerless polishing machine to an external diameter of 5 mm, followed by step-cut and D-cut machining, to obtain a final shaft. A length of the carbon fiber and glass fiber in the final shaft was 257 mm corresponding to the length of the shaft.

An outer surface of the shaft was coated with an ethylvinylacetate (EVA)-based hot melt, and an elastic body of polyurethane foam (MF-80 Foam, available from INOAC, Co., Japan) was attached at a high temperature of 110° C. to obtain a supplying roller having an outer diameter of 12.4 mm.

Example 5

A supplying roller was manufactured in the same manner as in Example 4, except that an outer diameter of the inner layer of the shaft was 3 mm, and an outer diameter of the outer layer was 5 mm.

Comparative Example 1

A supplying roller was manufactured in the same manner as in Example 1, except that a shaft was manufactured by cutting metal SUS 416 to have a diameter of 5 mm and a length of 257 mm.

Comparative Example 2

A supplying roller was manufactured in the same manner as in Example 1, except that a conductive shaft having a diameter of 5 mm and a length of 257 mm was manufactured from 100 parts by weight of carbon-containing polyoxymethylene (POM) resin (LG Chem, CF-610), 100 parts by weight of glass fiber (having a diameter of 9 μm and a length of 3 mm, CS03-JAFT-2, available from Akira Fiber Glass Co.), and 12 parts by weight of conductive carbon (Vulcan XC-72, available from Cabot Co., Ltd.) by using general injection molding.

Mechanical strength (flexural strength) and resistance to heat, corrosion and chemicals of the supplying rollers manufactured in Examples 1-5 and Comparative Examples 1 and 2 were evaluated. The results are shown in Table 1 below.

Evaluation Methods

Flexural Strength

Flexural strength was measured using a jig manufactured in-house, which measured a displacement of sagging in the middle of the shaft while loads of 200 gf and 400 gf were applied to the middle of the shaft with a distance of 200 mm between marking points.

Practical Mechanical Strength Evaluation

Practical evaluation was conducted with each of the supplying rollers equipped in a Samsung printer ML-1665K as a part of a developing unit. While an all-black pattern was continuously printed on 20 paper sheets, whether or when a toner supply failure occurred in the supplying roller was evaluated based on the following criteria.

Evaluation criteria

⊚: No toner supply shortage in the supplying roller

○: A concentration difference was seen after the half of all-black pattern.

Δ: A toner shortage was found in the supplying roller after the half of all-black pattern.

×: A toner shortage was found in the supplying roller at the beginning of all-black pattern.

Heat Resistance

Each shaft was left at 60° C. for 24 hours while weights of 300 gf and 500 gf were hung on the middle of the shaft with a distance of 200 mm between marking points. Then, a permanent sag deformation at which after removal of the weights each shaft does not return to its original state was read as runout, then evaluating heat resistance based on the following criteria.

Evaluation criteria

⊚: No deformation was found (300 g-weight basis)

○: 0.01≤deformation<0.02 (300 g-weight basis)

Δ: 0.02≤deformation<0.04 (300 g-weight basis)

×: 0.04≤deformation (300 g-weight basis)

Corrosion Resistance

A salt water spray test was conducted on each of the test shafts at a temperature of 35° C.±2° C. A 5 wt % NaCl aqueous solution was sprayed at a pressure of 1.25 Kg/cm² s for 4 hours, and a change, such as rusting on a shaft surface, was observed.

Evaluation criteria

⊚: No stain was found on the shaft surface after spraying.

○: One stain was found on the shaft surface after spraying (the size of stain not considered)

Δ: Two stains were found on the shaft surface after spraying

×: Three or more stains were found on the shaft surface after spraying

TABLE 1

|  | Example 1 | Example 2 | Example 3 | Example 4 | Example 5 | Comparative Example 1 | Comparative Example 2 |
|---|---|---|---|---|---|---|---|
| Shaft material and diameter | Single-layer carbon fiber Shaft diameter: 5 mm | Single-layer carbon fiber Shaft diameter: 5 mm | Single-layer carbon fiber Shaft diameter: 5 mm | Shaft's inner diameter: 3 mm Shaft's outer diameter: 5 mm | Shaft's inner diameter: 3 mm Shaft's outer diameter: 5 mm | SUS 416 single-layer Shaft diameter: 5 mm | Single-layer carbon fiber Shaft diameter: 5 mm |
| D/L of reinforcing fiber in shaft | 36,714 | 36,714 | 36,714 | Glass fiber: 36,714 Carbon fiber: 36,714 | Glass fiber: 36,714 Carbon fiber: 36,714 | — | 333.3 |

TABLE 1-continued

|  |  | Example 1 | Example 2 | Example 3 | Example 4 | Example 5 | Comparative Example 1 | Comparative Example 2 |
|---|---|---|---|---|---|---|---|---|
| (if having multi-layer structure) Inner-layer diameter to outer-layer diameter ratio | | — | — | — | 0.6 | 0.8 | — | — |
| Mechanical strength (flexural strength) | Practical evaluation | ○ | ○ | ○ | ○ | ○ | ◎ | X |
| | 200 gf | 0.079 mm | 0.079 mm | 0.079 mm | 0.115 mm | 0.162 mm | 0.049 mm | 0.265 mm |
| | 400 gf | 0.181 mm | 0.181 mm | 0.181 mm | 0.218 mm | 0.324 mm | 0.087 mm | 0.602 mm |
| Heat resistance (thermal strain) | | ○ | ○ | ○ | ○ | ○ | ◎ | Δ |
| Corrosion resistance | | ◎ | ◎ | ◎ | ◎ | ◎ | Δ | ◎ |
| Manufacture method | | pultrusion | Pultrusion | pultrusion | pultrusion | pultrusion | Cutting | Injection molding |

Referring to Table 1, the rollers of Examples 1-5 had good mechanical strengths, measured as flexural strengths, similar to the roller of Comparative Example 1 employing the SUS 316 metal shaft, regardless of whether they have a single layer or multi-layer structure. The rollers of Examples 1-5 all have markedly improved resistance both to corrosion and chemicals, and are considered not to functionally deteriorate and cause image quality degradation even when stored in a humid warehouse for a long time.

The roller of Comparative Example 2 was manufactured using glass fiber having a diameter of 9 μm and a length of 3 mm in consideration of the limitation of the injection molding method that long fiber corresponding to the length of the shaft cannot be used, unlike in Examples 1-5. As a result, the roller of Comparative Example 2 is shown to have seriously low flexural strength and heat resistance.

In the roller of Comparative Example 2, the diameter at the center region of the elastic body was significantly reduced forming an inverse crown shape when the outer surface of the shaft was polished. This is attributed to the insufficient flexural strength of the resin shaft with respect to polishing pressure.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A roller of an imaging apparatus, the roller comprising:
   a shaft including reinforcing fiber and a binder resin; and
   an elastic body surrounding an outer surface of the shaft,
   wherein an average length to average diameter ratio (L/D) of the reinforcing fiber is from about 15,000:1 to about 50,000:1.

2. The roller of claim 1, wherein the reinforcing fiber comprises at least one selected from the group consisting of glass fiber, carbon fiber, aromatic polyamide fiber, whole aromatic polyester fiber, super-strength polyethylene fiber, polybenzoxazole fiber, polybenzthiazole fiber, polyimide fiber, polybenzimidazole fiber, polyphenylene sulfide fiber, silicon carbide fiber, boron fiber, alumina fiber, and metal fiber.

3. The roller of claim 1, wherein the reinforcing fiber has an average length of from about 100 mm to about 500 mm.

4. The roller of claim 1, wherein the shaft has a multi-layer structure including an inner layer and an outer layer surrounding an outer surface of the inner layer.

5. The roller of claim 4, wherein an inner-layer diameter to outer-layer diameter ratio of the shaft is 0.85 or less.

6. The roller of claim 4, wherein the reinforcing fiber of the inner layer comprises glass fiber, and the reinforcing fiber of the outer layer comprises carbon fiber.

7. The roller of claim 1, wherein the binder resin comprises at least one selected from the group consisting of polyester resin, vinyl ester resin, epoxy resin, phenol resin, and polyimide resin.

8. The roller of claim 1, wherein the shaft comprises about 40 parts to about 250 parts by weight of the reinforcing fiber with respect to 100 parts by weight of the binder resin.

9. The roller of claim 1, wherein the elastic body comprises at least one selected from the group consisting of urethane rubber, acrylonitrile rubber, epichlorohydrin rubber, acrylonitrile butadiene rubber, nitrile butadiene rubber, acrylonitrile butadiene isoprene rubber, silicon rubber, ethylene propylene rubber, ethylene propylene diene rubber, styrene butadiene rubber, polyolefin-based resin, fluorine-based resin, urethane foam, and silicon foam.

10. The roller of claim 1, wherein the roller is a developing roller, a supplying roller, a cleaning roller, a charging roller, or a transfer roller of the imaging apparatus.

11. An imaging apparatus comprising:
   an image carrier on which an electrostatic latent image is formed;
   a developing roller to supply toner to the image carrier;
   a supplying roller to supply toner to the developing roller; and
   a charging roller to charge the image carrier,
   wherein at least one of the developing roller, the supplying roller, and the charging roller comprises the roller of claim 1.

* * * * *

UNITED STATES PATENT AND TRADEMARK OFFICE
CERTIFICATE OF CORRECTION

PATENT NO. : 9,005,093 B2
APPLICATION NO. : 13/367796
DATED : April 14, 2015
INVENTOR(S) : Soon-nam Kim et al.

It is certified that error appears in the above-identified patent and that said Letters Patent is hereby corrected as shown below:

Claims

Col. 12, line 54, In Claim 11, delete "carrier," and insert --carrier-- therefor.

Signed and Sealed this
Twentieth Day of October, 2015

Michelle K. Lee
*Director of the United States Patent and Trademark Office*